United States Patent
Bartels

(10) Patent No.: US 10,471,759 B2
(45) Date of Patent: Nov. 12, 2019

(54) MANUFACTURING OF A SECURITY DOCUMENT

(71) Applicant: AGFA GRAPHICS NV, Mortsel (BE)

(72) Inventor: Rudolf Bartels, Mortsel (BE)

(73) Assignee: AGFA NV, Mortsel (BE)

(*) Notice: Subject to any disclaimer, the term of this patent is extended or adjusted under 35 U.S.C. 154(b) by 32 days.

(21) Appl. No.: 15/590,163

(22) Filed: May 9, 2017

(65) Prior Publication Data

US 2017/0326899 A1 Nov. 16, 2017

(30) Foreign Application Priority Data

May 10, 2016 (EP) .................................. 16168932

(51) Int. Cl.
| | |
|---|---|
| B42D 25/337 | (2014.01) |
| H04N 1/44 | (2006.01) |
| B41M 3/14 | (2006.01) |
| B42D 25/41 | (2014.01) |
| H04N 1/405 | (2006.01) |
| B42D 25/435 | (2014.01) |
| B42D 25/324 | (2014.01) |

(52) U.S. Cl.
CPC .............. *B42D 25/337* (2014.10); *B41M 3/14* (2013.01); *B42D 25/324* (2014.10); *B42D 25/41* (2014.10); *B42D 25/435* (2014.10); *H04N 1/4055* (2013.01); *H04N 1/444* (2013.01)

(58) Field of Classification Search
CPC .... B42D 25/337; B42D 25/324; B42D 25/41; B42D 25/435; H04N 1/444; H04N 1/4055; B41M 3/14
USPC ..................... 283/67, 70, 72, 73, 74, 93, 901
See application file for complete search history.

(56) References Cited

U.S. PATENT DOCUMENTS

| | | | |
|---|---|---|---|
| 5,995,638 A | 11/1999 | Amidror et al. | |
| 6,198,545 B1 | 3/2001 | Ostromoukhov et al. | |
| 2003/0038974 A1 | 2/2003 | Hu | |
| 2003/0048477 A1 | 3/2003 | Russell | |
| 2004/0001604 A1* | 1/2004 | Amidror | B42D 25/342 |
| | | | 382/100 |

FOREIGN PATENT DOCUMENTS

| | | |
|---|---|---|
| WO | 03/057503 A1 | 7/2003 |
| WO | 2011/044704 A1 | 4/2011 |

OTHER PUBLICATIONS

Bartels, "Manufacturing of a security document", U.S. Appl. No. 16/429,248, filed Jun. 3, 2019.

\* cited by examiner

*Primary Examiner* — Justin V Lewis
(74) *Attorney, Agent, or Firm* — Keating and Bennett, LLP

(57) ABSTRACT

A method for manufacturing a security document including a security pattern generation method includes the steps of selecting a bounding region, an image object, and a raster image or a function; cutting the image object into image object partitions; and repeating the image object as a pattern, preferably a lattice pattern, in the bounding region wherein each of the image object partitions of an image object is transformed depending on the position area of the image object in the lattice pattern and the rank of the image object partition.

15 Claims, 8 Drawing Sheets

MANUFACTURING OF A SECURITY DOCUMENT

CROSS REFERENCE TO RELATED APPLICATIONS

This application claims priority to European Application No. 16168932.8, filed May 10, 2016, which is incorporated by reference herein in its entirety.

BACKGROUND OF THE INVENTION

1. Field of the Invention

The invention relates to the manufacturing of a security document comprising a graphic object which is generated as a security pattern to prevent forgery and counterfeiting.

2. Description of the Related Art

Security printing is the field of the printing industry that deals with printing of content such as banknotes, passports, tamper-evident labels, product authentication, stock certificates, postage stamps and identity cards. The main goal of security printing is to prevent forgery, tampering, and counterfeiting. Security documents are normally printed with high resolutions to make copying not feasible More recently many of the techniques, used to protect these high-value documents, have become more and more available to commercial printers whether they are using the more traditional offset and flexographic presses or the newer digital platforms, such as inkjet presses with resolution below 4800 dpi. Businesses are protecting their lesser-value documents such as transcripts, coupons and prescription pads by incorporating some of the same features as used in security printing to ensure that they cannot be forged or that alteration of the data cannot occur undetected.

A known technique in security printing is the generation of repeat patterns in a determined space of security document at a high printing resolution, such as the creation of guilloches, which is a repeat pattern. Such repeat patterns, especially when they are rendered in a high printing resolution, are difficult to copy and thus ideal to prevent forgery, tampering or counterfeiting. Also the repeating of geometric graphic objects in a repeat pattern, also called geometric repeat pattern, is an advantage to secure your documents against forgery.

The creation of repeat pattern in a determined space of a security document is in the state-of-the-art generated automatically by known computer implemented and mathematical methods.

The repeat pattern generation methods remain long time secret to the user but the free availability of handbooks and tutorials makes the use of such patterns for security documents less suitable to prevent forgery, tampering or counterfeiting. The high resolution rendering and/or printing of such documents makes such repeat patterns still valuable for forgery prevention but there is need to enhance the value of forgery prevention for these patterns and to battle against the counterfeiting business which is growing exponentially.

SUMMARY OF THE INVENTION

A preferred embodiment of the disclosed invention is a method to extend the prevention of forgery, tampering and counterfeiting by repeating image objects in a pattern but variable adapting the repeated image objects in the pattern based on the position of these image objects in the pattern. By these adaptations the prevention is altered and counterfeiting of security documents with such variable repeat patterns is harder to do and at relatively high cost.

The preferred embodiments of the present invention have been realised with a method for manufacturing a security document as defined below.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
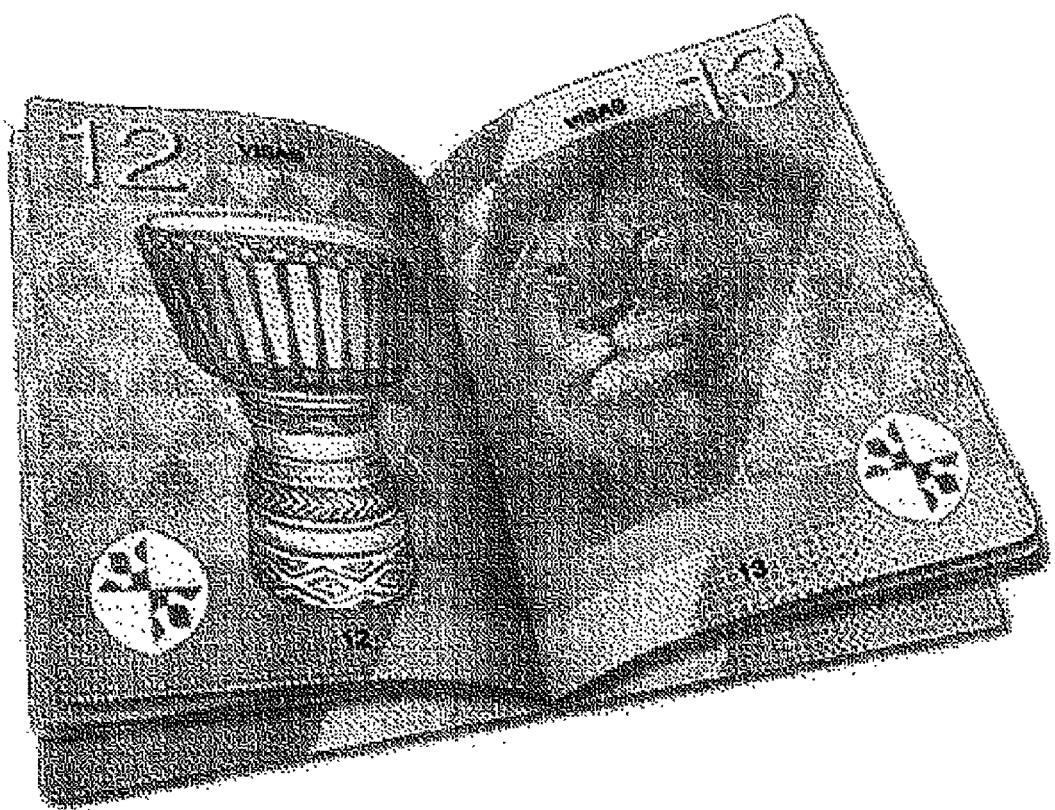
FIG. 1 illustrates a prior-art manufactured security document with several pages: a passport.
Figure 2:
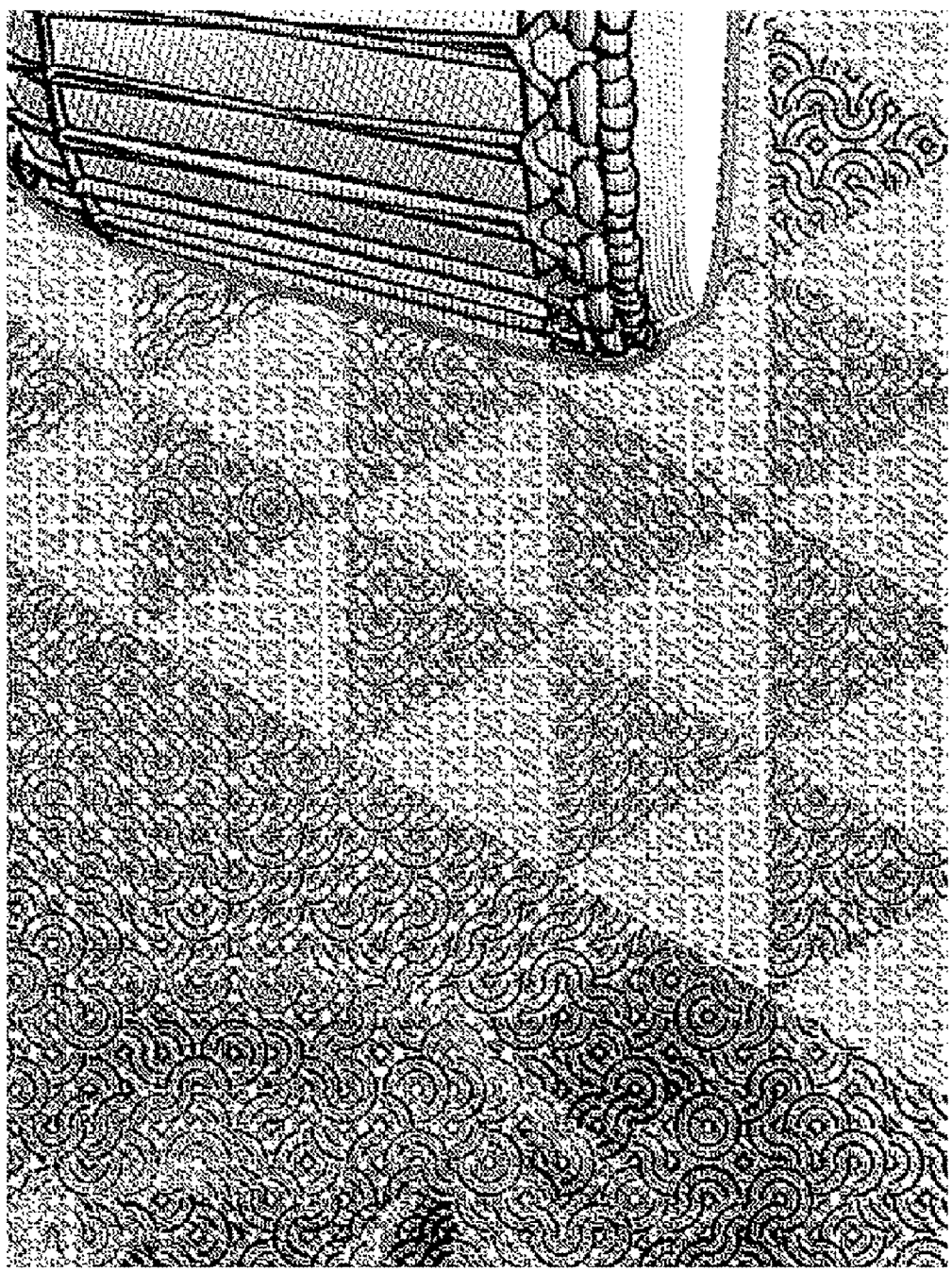
FIG. 2 illustrates a detail of page 12 and 13 from this passport wherein prior-art repeat patterns are shown.
Figure 3:
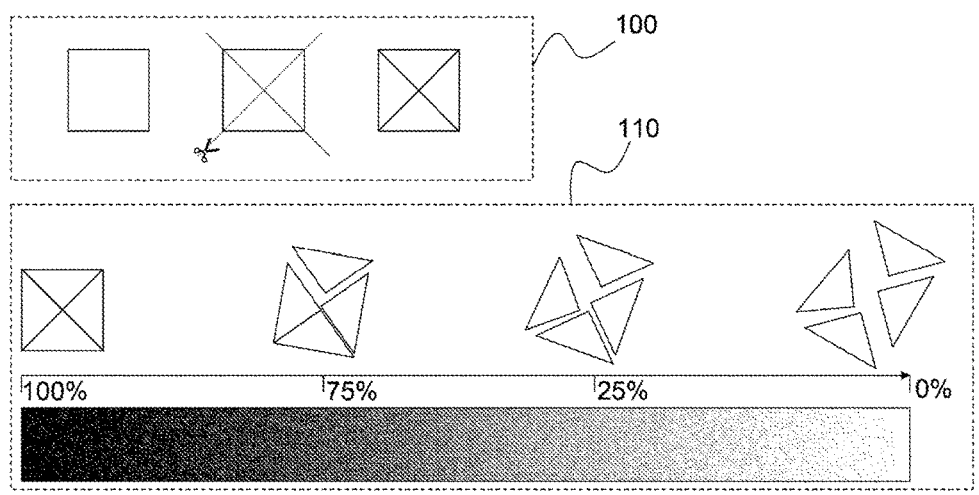
FIG. 3 illustrates an example from a part of a preferred embodiment from the present invention. The first step (100) shows a square as the selected image object which is cut (scissor symbol) in four triangles, as image object partitions ($PAR_{V,1}, \ldots, PAR_{V,P}$). The second step (110) shows the image transformations which are rotations and translations, based on the gray values from a gray gradient, also called gray vignette, between 0 and 100 percent, the selected raster image. Each image object partition is transformed depending on its ranking and the gray value of the vignette, showed below. The left triangle is rotated differently than the other triangles. The gradient is shown here as a raster image ($IMG_R$) but may also be defined as a function ($FUN_R(x, y)$).
Figure 4:
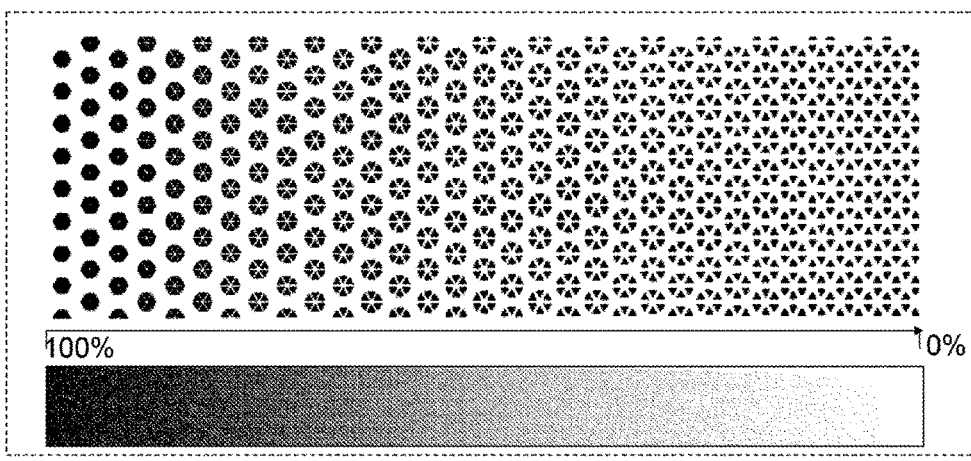
FIG. 4 illustrates a variable repeat pattern resulted from a preferred embodiment of the present invention. The regular hexagon, as vector graphic, is cut in 6 equal triangles ($PAR_{V,1}, \ldots, PAR_{V,P}$) through the axes of symmetry and is repeated in a rectangular bounding region (BRG). Each 6 equal triangle is displaced away from the centre of the regular hexagon with a distance depending on its position and the gray values of the gray gradient between 0% and 100% in that position relative to the gradient. The gradient is shown here as a raster image ($IMG_R$) but may also be defined as a function ($FUN_R(x, y)$).
Figure 5:
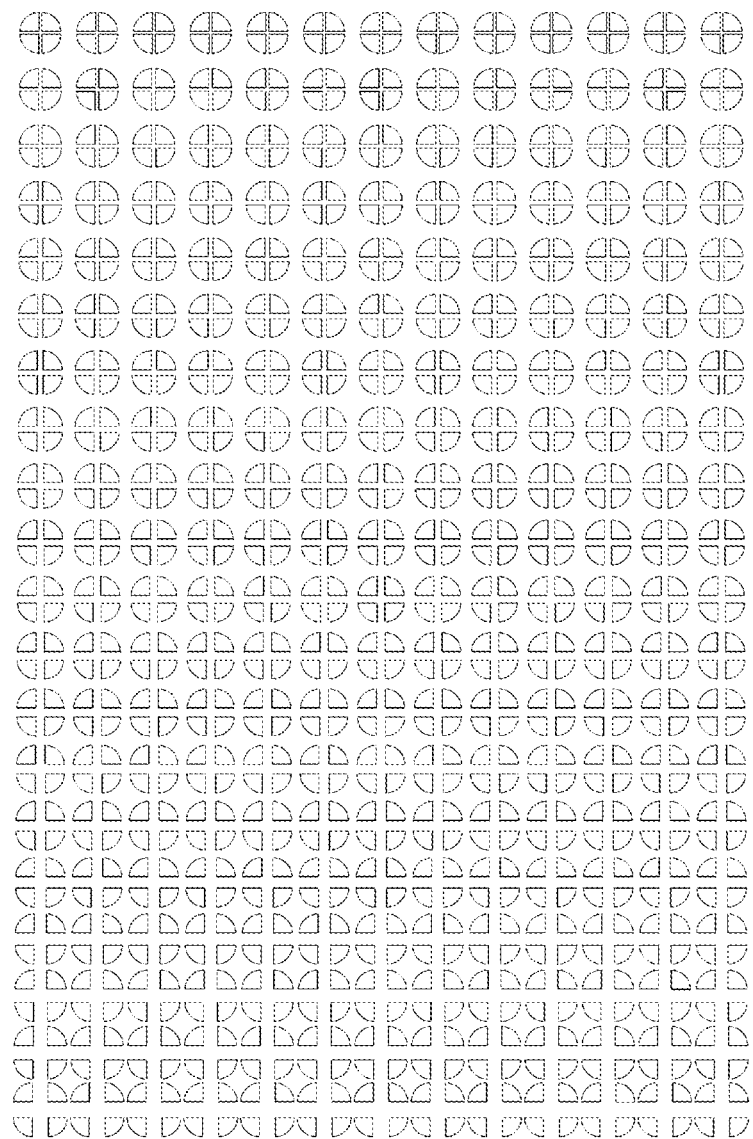
FIG. 5 illustrates a result of the method from a preferred embodiment wherein the patterned image object ($IMG_V$) is a circle, cut in four image object partitions ($PAR_{V,1}, \ldots, PAR_{V,P}$) which are translated away from the centre of the image object ($IMG_V$) in the repeat pattern, based on a gradient which is not visible in this figure. The bounding region (BRG) is a rectangle. The image transformation of each image object partition is only a translation depending on the gray values of an invisible horizontal gray gradient from 0% to 100%; the ranking of the image object partition and the position of the patterned image object ($IMG_V$) in the bounding region (BRG).
Figure 6:
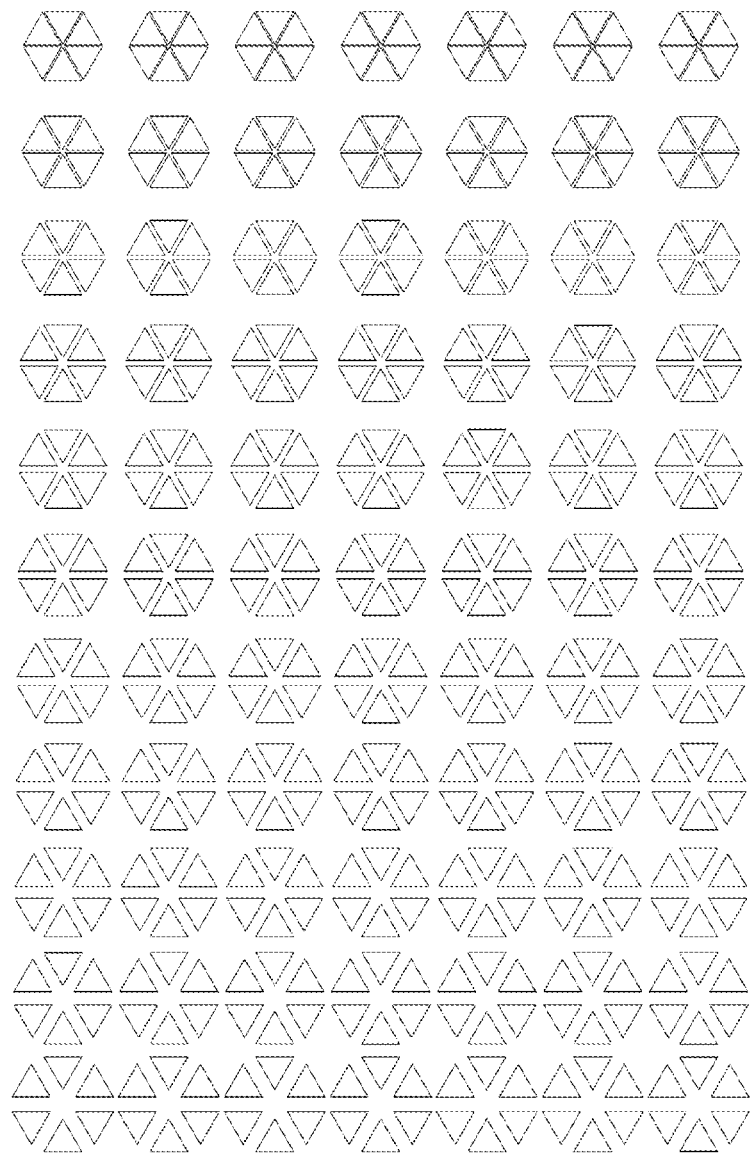
FIG. 6 illustrates a result of the method from a preferred embodiment wherein the patterned image object ($IMG_V$) is a hexagon, cut in six image object partitions ($PAR_{V,1}, \ldots, PAR_{V,P}$) which are translated away from the centre of the image object ($IMG_V$) in the repeat pattern, based on a gradient which is not visible in this figure. The bounding region (BRG) is a rectangle. The image transformation of each image object partition is only a translation depending on the gray values of an invisible horizontal gray gradient from 0% to 100%; the ranking of the image object partition and the position of the patterned image object ($IMG_V$) in the bounding region (BRG).

A preferred embodiment of the present invention is a method for manufacturing a security document wherein an image object, used for the repeat pattern, is cut in parts, also called segments, and each part is transformed depending on the position of the image object in the repeat pattern to become a variable repeat pattern.

So the method for manufacturing a security document comprises a pattern generation method, more precisely a repeat pattern generation method, with the following steps:

selecting a bounding region (BRG) in a document (DOC), an image object ($IMG_V$); a raster image ($IMG_R$); and cutting the image object ($IMG_V$) in P image object partitions ($PAR_{V,1}, \ldots, PAR_{V,P}$); and preferably determining for each image object partition a ranking (p); and selecting a task ($TSK(p, x_1, x_2, \ldots x_N)$) comprising a sequence of image transformations ($IMT_1, \ldots, IMT_N$) wherein minimum one of its image transformations depends on input parameters of the task; and—repeating the image object ($IMG_V$) as a pattern, preferably a lattice pattern, in the bounding region (BRG); and determining for each image object ($IMG_V$) from the pattern a position area in the bounding region (BRG); and a set of values ($[v_1, v_2, \ldots v_N]$) from the pixels in the raster image ($IMG_R$) at the or the same position area relative to the raster image ($IMG_R$); and transforming each of its image object partitions ($PAR_{V,1}, \ldots, PAR_{V,P}$) by the task ($TSK(p, x_1, x_2, \ldots x_N)$) with the determined set of values ($[v_1, v_2, \ldots v_N]$) as input value of the task and preferably with ranking (p) of the image object partition as input value of the task.

This kind of pattern in the security document is called further in the description a variable repeat pattern.

The determined set of values ($[v_1, v_2, \ldots v_N]$) can be any set of values derived from the raster image ($IMG_R$), especially in the position area or the same position area relative to the raster image ($IMG_R$), preferably the determined set of values ($[v_1, v_2, \ldots v_N]$) is the color value or averaged color value in this position area and more preferably is the gray value or averaged gray value in this relative position area. So the image transformations depend on this color value, average color value, gray value or averaged gray value.

The position area may be limited to the position image object ($IMG_V$) in the bounding region (BRG).

In a preferred embodiment prior the selection of the raster image ($IMG_R$), is the raster image ($IMG_R$) generated with the similar dimension and shape as the bounding region (BRG) and filled with a gradient, which is an image containing a gradual change of colors. The gradient may be a radial gradient.

A task is a sequence of instructions which are in the present invention image transformations. A task is sometimes is similar as sub-routine, procedure or function in computer programming.

And/or the present invention comprises a pattern generation method, more precisely a repeat pattern generation method, with the following steps:

selecting a bounding region (BRG) in a document (DOC), an image object ($IMG_V$); a function ($FUN_R(x, y)$); and cutting the image object ($IMG_V$) in P image object partitions ($PAR_{V,1}, \ldots, PAR_{V,P}$); and preferably determining for each image object partition a ranking (p); and selecting a task ($TSK(p, [x_1, x_2, \ldots x_N])$) comprising a sequence of image transformations ($IMT_1, \ldots, IMT_N$) wherein minimum one of its image transformations depends on input parameters of the task; and repeating the image object ($IMG_V$) as a pattern, preferably a lattice pattern in the bounding region (BRG); and determining for each image object ($IMG_V$) from the pattern a position in the bounding region (BRG); and returning a set of values ($[v_1, v_2, \ldots v_N]$) from the function ($FUN_R(x, y)$) with the position as input value for the function; and transforming each of its image object partitions ($PAR_{V,1}, \ldots, PAR_{V,P}$) by the task ($TSK(p, x_1, x_2, \ldots x_N)$) with the determined set of values ($[v_1, v_2, \ldots v_N]$) as input value of the task and preferably with ranking (p) of the image object partition as input value of the task.

This kind of pattern in the security document is called further in the description a variable repeat pattern.

A preferred embodiment of it comprises an extra step: determining an identifier (id);

and wherein the returning a set of values ($[v_1, v_2, \ldots v_N]$) from the function ($FUN_R([x, y], id)$) is from the position and identifier (id) as input value of the function. Mostly all security documents comprise an identifier (id) which is mostly unique. This may be a name, identity number, a product number whether or not combined with a date. This preferred embodiment makes it possible to make the repeat pattern variable depending on this identifier which is preferably a unique identifier so it becomes a unique variable repeat pattern. The determination of an identifier (id) is an advantage for the prevention of counterfeiting of security documents.

In a preferred embodiment is the function ($FUN_R(x, y)$) defined with as output a gradual change of colors depending on its input-parameters.

By the image transformations ($IMT_1, \ldots, IMT_N$) on each image object partitions ($PAR_{V,1}, \ldots, PAR_{V,P}$) of the image objects in the lattice pattern, wherein the image transformation is based on the position area or position of the image objects in the pattern, the prevention is altered and counterfeiting of security documents with such variable repeat patterns is harder to do and at relatively high cost.

The pattern in the presented inventions and their preferred embodiments is preferably a lattice pattern. This lattice pattern is preferable selected from the group consisting of rectangular lattice, parallelogrammic lattice, equilateral triangular lattice, rhombic lattice, square lattice and hexagonal lattice. A lattice pattern in the present invention and preferred embodiments is a two-dimensional lattice pattern, also called 2D-lattice and more preferably defined in the Euclidean plane. An irregular pattern, such as positioning with a blue noise pattern, is also possible but this is more time consuming to generate the variable repeat pattern and difficult to detect counterfeited security documents.

To cut the image object ($IMG_V$) in P image object partitions, it is preferred to have similar, such as equal shaped or equal sized, image object partitions for easy recognition that a pattern is counterfeited or not. Therefore the cutting step in a preferred embodiment is cutting through one or more axes of symmetry of the image object ($IMG_V$) to get these P image object partitions ($PAR_{V,1}, \ldots, PAR_{V,P}$). The cutting step in a preferred embodiment is cutting through 1 axis of symmetry of the image object ($IMG_V$) or 2, 3, 4, 5, 6, 7, 8 different axes of symmetry of the image object ($IMG_V$) to get these P image object partitions ($PAR_{V,1}, \ldots, PAR_{V,P}$).

Another example of equal shaped image object partitions division is cut through the centre of the image object ($IMG_V$) to its border such as dividing a hexagon into three equal parts. Such image object partitions are also called fractions or if the image object ($IMG_V$) is round shaped also pizza pieces or pie shapes. An image object partition is preferably triangular or trapezium shaped.

The number of image object partitions (P) is preferably between 2 and 4 more preferably between 3 and 8 and most preferably between 6 and 64. The smaller the number of image object partitions are, easier it shall be for counterfeiting. A too high number of image object partitions make it more time consuming for calculating the image transformations of each image object partitions in the lattice pattern.

Any image transformation is possible but in a preferred embodiment each image transformations from the sequence of image transformations ($IMT_1, \ldots, IMT_M$) is selected from the group consisting of geometric transformation, color transformation, line thickness transformation and dashed line transformation. The geometric transformation may be translation, rotation, reflection, transflection, scaling or shear mapping. In a preferred embodiment each image transformations from the sequence of image transformations ($IMT_1, \ldots, IMT_M$) selected from the group consisting of translation, rotation and scaling. Translation as image transformation is also called displacement. The varying of the repeat pattern with these kinds of image transformations makes it harder to counterfeit and the variable repeat pattern is a joy to watch. The number of image transformations in the sequence ($IMT_1, \ldots, IMT_M$) is more than zero, 1 or more than 1, but preferably between 1 and 100, more preferably between 1 and 25. The number of image transformations is preferably limited until 100 else the calculation of the image transformations of each image object partition shall take too long.

If image-transformed image object partitions are in overlap, even not from the same patterned image object ($IMG_V$) than several algorithms may be used to render a flatten image as result such as for example known in Adobe Photoshop™ CS6 for flattening layers by multiplying, darkening, linear burning, . . . . The raster image ($IMG_R$) may be rendered together with the variable repeat pattern in the same bounding region. In a preferred embodiment is the rendering of the raster image ($IMG_R$) in the same bounding region performed by layering technology such as Adobe Photoshop™ CS6 for flattening layers by multiplying, darkening, linear burning, . . . . In a preferred embodiment inherit each image object partition ($PAR_{V,1}, \ldots, PAR_{V,P}$) the color or gray value of the raster image ($IMG_R$) that is determined from the pixels in the raster image ($IMG_R$) at the same position area relative to the raster image ($IMG_R$).

Minimum one of the image transformation in the sequence depends on the position area or position of the image object ($IMG_V$) in the pattern or lattice pattern. Preferably all the image transformation in the sequence depends on the position area or position of the image object ($IMG_V$) in the pattern or the lattice pattern. In a preferred embodiment minimum one of the image transformation in the sequence depends on a determined identifier or more preferably on a determined unique identifier, such as an passport number. This makes the variable repeat pattern depended on this identifier which makes it even more difficult to counterfeit.

It is found that after cutting the image object ($IMG_V$), especially when the image object is a vector graphic, that an image object partition is not a uniform set, for example it comprises broken lines. So a preferred embodiment comprises an extra step adding a contour line around each image object partitions of the P image object partitions ($PAR_{V,1}, \ldots, PAR_{V,P}$).

In a preferred embodiment the image transformation of each image object partition ($PAR_{V,1}, \ldots, PAR_{V,P}$) is a translation away of the centre of the image object ($IMG_V$) in the pattern or the lattice pattern. The distance in the translation, depending on the determined set of values ($[v_1, v_2, \ldots v_N]$) may be different for each image object partition ($PAR_{V,1}, \ldots, PAR_{V,P}$) which is preferably determined by its ranking (p).

In a preferred embodiment the pattern or the lattice pattern is printed with a printing resolution between 4800 dots-per-inch and 15200 dots-per-inch. Higher the resolution, more accurate the image transformations can be handled on each image object partitions ($PAR_{V,1}, \ldots, PAR_{V,P}$) and more difficult it is for counterfeiting due to the relative high print cost.

The manufacturing a security document from the invention and in all its preferred embodiments may further comprising the step clipping all parts of transformed image object partitions outside the bounding region (BRG). Depending on the kind of image transformations and the input parameters of the task, an image object partition may be come transformed outside the bounding region so a clipping or partly clipping of such image object partitions may be needed.

In a preferred embodiment is the image object ($IMG_V$) a vector graphic and more preferably triangular, quadratic, rectangular, heptagonal, pentagonal, oval, rhombus, octagonal, circular, oval, regular polygonal or elliptical shaped. It is found that regular and/or simple shaped image object ($IMG_V$), which is repeated in the variable repeat pattern of the present invention with all its preferred embodiments, makes it easier to detect counterfeits of security documents.

The image object ($IMG_V$) may also be a logo or even an image, for example a photo of the owner of the security document, such as an identity card. This latest example makes the security document more unique and more difficult to counterfeit. In a preferred embodiment is the image object (IMGV) the result of a triangular, quadratic, rectangular, heptagonal, pentagonal, oval, rhombus, octagonal, circular, oval, regular polygonal or elliptical shaped cut from a guilloche, photo, logo or image.

Figure 7:
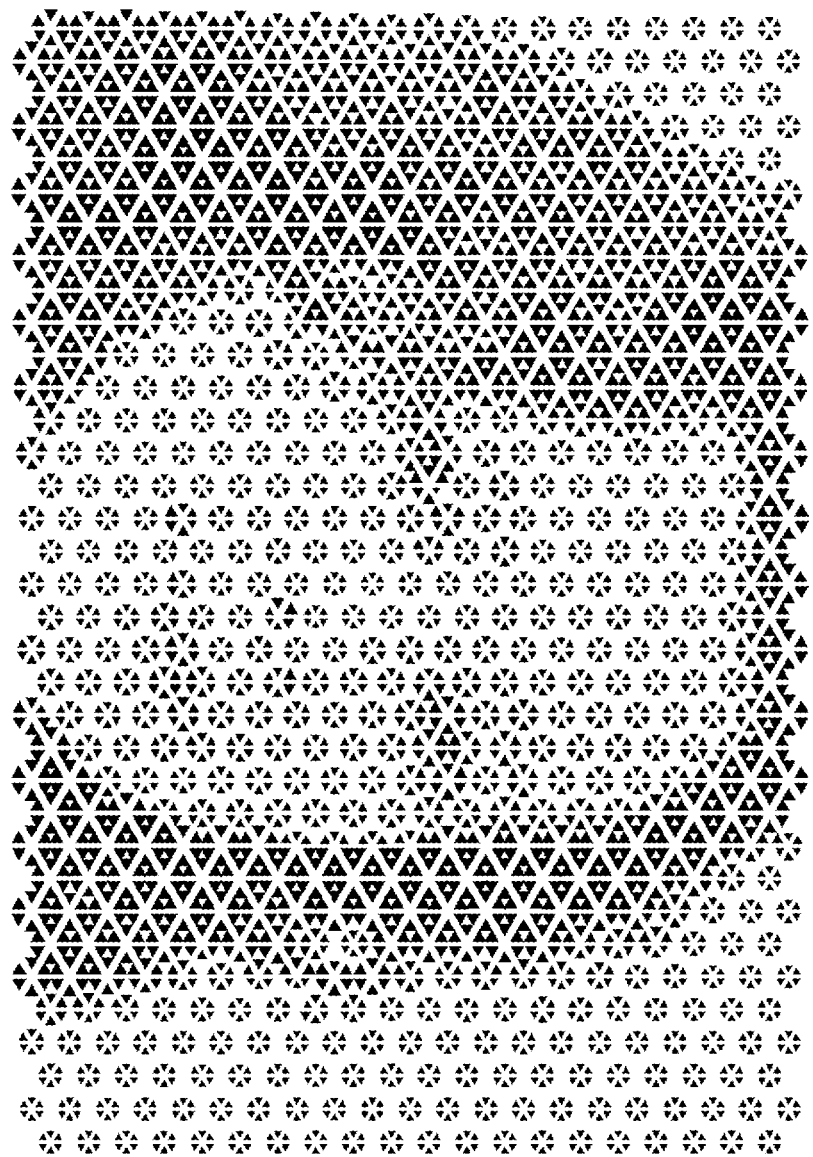
FIG. 7 illustrates a result of the method from a preferred embodiment wherein the patterned image object ($IMG_V$) is a hexagonal, cut in six image object partitions ($PAR_{V,1}, \ldots, PAR_{V,P}$) which are translated away from the centre of the image object ($IMG_V$) in the repeat pattern, based on an gray image of a woman which is not visible in this figure but becomes slightly visible in this result. The bounding region (BRG) is a rectangle. The image transformation of each image object partition is a translation and scaling depending on the gray values of the gray image of a woman; the ranking of the image object partition and the position of the patterned image object ($IMG_V$) in the bounding region (BRG).
Figure 8:
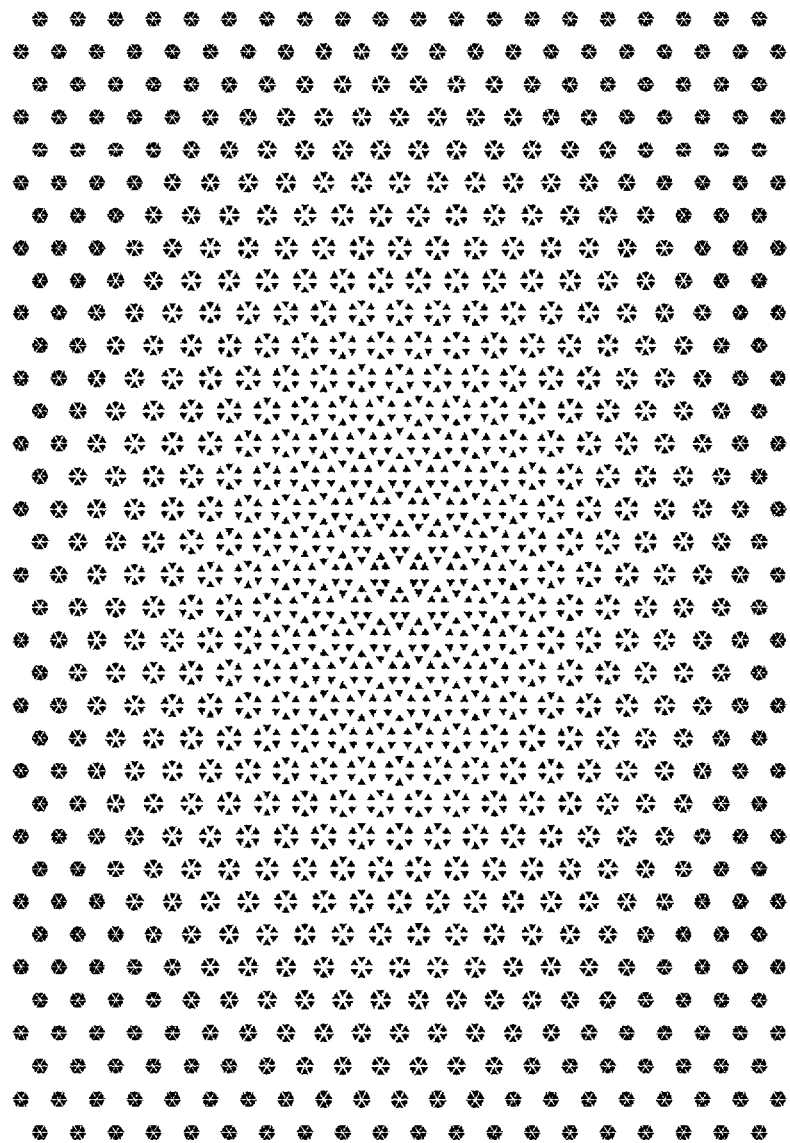
FIG. 8 illustrates a result of the method from a preferred embodiment wherein the patterned image object ($IMG_V$) is a hexagon, cut in six image object partitions ($PAR_{V,1}, \ldots, PAR_{V,P}$) which are translated away from the centre of the image object ($IMG_V$) in the repeat pattern, based on a radial gradient which is not visible in this figure. The bounding region (BRG) is a rectangle. The image transformation of each image object partition is a translation depending on the gray values of an invisible horizontal radial gray gradient from 0% to 100%; the ranking of the image object partition and the position of the patterned image object ($IMG_V$) in the bounding region (BRG).
Figure 9:
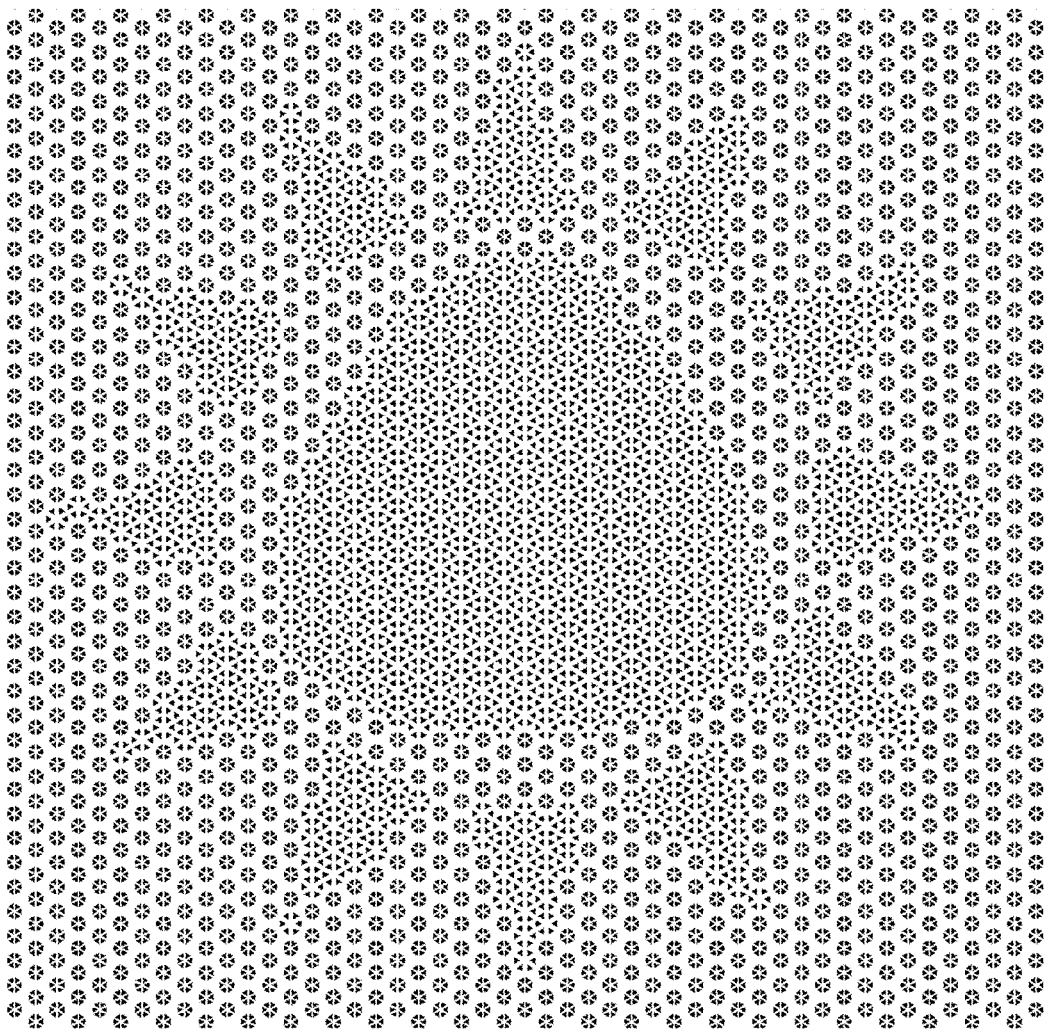
FIG. 9 illustrates a result of the method from a preferred embodiment wherein the patterned image object ($IMG_V$) is a hexagonal, cut in six image object partitions ($PAR_{V,1}, \ldots, PAR_{V,P}$) which are translated away from the centre of the image object ($IMG_V$) in the repeat pattern, based on vector image illustrating a sun which is not visible in this figure but becomes slightly visible in this result. The bounding region (BRG) is a rectangle. The image transformation of each image object partition is a translation depending on the color values of the vector image illustrating a sun; the ranking of the image object partition and the position of the patterned image object ($IMG_V$) in the bounding region (BRG).

Also the raster image ($IMG_R$) may be a logo or an image, for example a photo of the owner of the security document, such as an identity card. This latest example makes the security document more unique and more difficult to counterfeit (see FIG. 7 and FIG. 9).

The bounding region (BRG), which is a determined space in a document, may be triangular, quadratic, rectangular, heptagonal, pentagonal, oval, rhombus, octagonal, circular, oval, regular polygonal or elliptical shaped. It is preferably rectangular and than also called bounding box.

A method for manufacturing a security document according to present invention including its preferred embodiments wherein the security document is a passport; identity card, driving license, postage stamp, product authentication, a banknote or stock certificate. The present invention is also a passport; identity card, driving license, postage stamp, product authentication, a banknote or stock certificate manufactured as the disclosed method and its preferred embodiments from the present invention.

The determination of the ranking of each image object partitions ($PAR_{V,1}$, . . . , $PAR_{V,P}$) may be determined by going one by one through image object partitions in a clock-wise rotation or counter-clock-wise rotation around the centre of the image object ($IMG_V$). More than one image object partitions may have the same ranking but preferably the ranking is differently for each image object partitions of the image object.

A determined identifier, as feature, in preferred embodiments may be a string which is a spatial and/or temporal sequence of individual characters with predetermined reading direction, such as a social registration number of a person. A character can especially be a letter or a number. A string can contain both letters and numbers. Strings are the same, if both strings at both the beginning, in the order, and at the end of match, in particular have identical strings the same number of characters. A string is partially identical to another string, if at least two consecutive characters of a string matching a partial sequence of the other string.

Otherwise, the strings can have different lengths.

The image object ($IMG_V$) is in the present invention patterned in a bounding region (BRG), the position area, mostly a coordinate (x,y), in this bounding region (BRG) is easily determined because it is specified by the pattern or the lattice pattern. At the same position area for example the coordinate (x, y) but now relatively to the raster image ($IMG_R$), or preferably on a region-of-interest from the raster image ($IMG_R$) a set of values is determined. This relativity may depend on the resolution of the raster image ($IMG_R$). The set of values may for example be the color value in RGB, CMY or gray or averaged color value in RGB, CIELAB, CMY or gray in this relative position area from the raster image ($IMG_R$).

Document

A document comprises content, preferably graphically arranged, also called assembled, in a document space. A document is digital stored in a storage unit such as hard disk drive (HDD) connected to a hardware configuration such as a computer, memory in a central processing unit (CPU) comprised in a hardware configuration and the like. The graphically arrangement, also called lay-outing, of the content in the document space is also called the lay-out of the document.

A document may comprise a static layout or preferably a dynamic layout. Static layout design may involve more graphic design and visual art skills; whereas dynamic layout design may involve more interactive design and content management skills to thoroughly anticipate content variation.

The document space of the document may be a two-dimensional space with two fixed dimensions, more preferably the document space is a page or multiple pages and most preferably a web-page.

The document space may be a two-dimensional space with one fixed and one endless dimension such as in the rendering method of multiple print jobs disclosed in EP 1933257 (Agfa Graphics NV).

A raster graphic is also known as a bitmap, raster image, contone or a bitmapped graphic and represent a two-dimensional discrete image P(x,y).

A vector graphic, also known as object-oriented graphic, uses geometrical primitives such as points, lines, curves, and shapes or polygon(s), which are all based on mathematical expressions, to represent an image. A vector graphic may be a turtle graphic which uses a relative cursor (the "turtle") upon a Cartesian plane. Turtle graphics is a key feature of the Logo programming language. A vector graphic is thus a set of draw instructions. A vector graphic is in the present invention a two-dimensional vector graphic.

A content object is a raster or vector graphic which defines certain content in a bounded shape, such as the variable repeat pattern of the present invention which comprises several content objects, namely image objects, in a repeated and patterned way. The minimum rectangle around the bounded shape is called bounding box of a content object. A document comprises one or more layouted content object. A content object in a document may be defined in a vector graphics format, also called linework format, such as Logo, Scale Vector Graphics (SVG) or AutoCad Drawing Exchange Format (DXF) and more preferably defined in a page description language (PDL) such as Printer Command Language (PCL): developed by Hewlett Packard, Postscript (PS), Encapsuled Postscript (EPS): developed by Adobe Systems or Portable Document Format (PDF): developed by Adobe Systems.

Preferably the lay-out of the document is created in a desktop publishing (DTP) software package such as Adobe InDesign™, Adobe PageMaker™, QuarkXpress™ or Scribus (http://scribus.net/canvas/Scribus). Other software packages are Adobe Illustrator™, CorelDraw™; InkScape™, Affinity Designer™.

The content objects in a document may be defined in a document markup language, also called mark-up language, such as IBM's Generalized Markup Language (GML) or Standard Generalized Markup Language (ISO 8879:1986 SGML), more preferably defined in HyperText Markup Language (HTML) and most preferably defined in HTML5, the fifth revision of the HTML standard (created in 1990 and standardized as HTML 4 as of 1997) and, as of December 2012, is a candidate recommendation of the World Wide Web Consortium (W3C). Such a document is sometimes called a web-document.

The layout of a web-document may be created in a web-design software package by Cascading Style Sheets (CSS), a style sheet language used for describing the content of the document in the document markup language and more preferably the layout of a web-document is created in a web-design software package by Cascading Style Sheets 3 (CSS3), published from the CSS Working Group of the World Wide Web Consortium (W3C).

The content objects in a document may be defined in a Variable Data Printing format (VDP) such as Intelligent Printer Data Streams (IPDS): found in the AS400 and IBM mainframe environments and used with dot matrix printers, Variable data Intelligent PostScript Printware (VIPP): A proprietary VDP language from Xerox, traditionally used in the transactional black-and-white printing market, Variable Print Specification (VPS): a VDP language from Creo, Advanced Function Presentation (AFP) format defined by AFP Consortium (AFPC), more preferably defined in Personalized Print Markup Language (PPML), an XML-based industry standard printer language for variable data printing defined by Printing On Demand Initiative (PODi) and most preferably defined in PDF/VT published in 2010 as ISO 16612-2.

In a preferred embodiment a document is defined in a document format selected from vector graphic formats, document markup language or variable data printing format, more preferably selected from page description formats, variable data printing format or document markup language and most preferably selected from Portable Document Format (PDF) or the fifth revision of HyperText Markup Language (HTML5).

Security Document

A security document is a printed document or layouted document which comprises one or more content objects to prevent copying, forgery, tampering and to battle against counterfeiting and to protect a brand of brand owners.

Examples of security documents are tax labels, lottery tickets, event tickets, design vouchers, identity cards, banknotes, legal documents and official documents, certificates, passports, identity documents, driver's licenses or packages for luxury or pharmaceutical products.

Examples of content objects, as security feature to prevent copying, forgery and/or tampering are guilloches, anti-photocopy patters, latent image designs, microtext, security screening, repeat patterns, such as guilloches, and geometric repeat patterns, such as space filling curves. Such content objects are called security enabled content objects.

A security document is preferably layouted in a digital assembly system, such as a desktop publishing (DTP) software package or a web-design software package. Such system comprises than a graphic base editor wherein security enabled content objects can be added in a document. It has preferably a modular approach to add one or more security features in the security document. The digital assembly system replaces the old labour intensive, mechanical pattern generation devices. The digital assembly system goes fare beyond the limitations imposed by these mechanical pattern generation devices. The easy calculation and combination of a lot of parameters makes life of the designer of the security document easy and enables him to implement more security in the same amount of time.

Examples of such digital assembly system for security printing are: Fortuna™ by Agfa Graphics; security design software of JURA™, a Hungarian company (www.jura.hu); ONE of KBA™ (www.kbanotasys.com/banknote-printing/pre-press-and-design) and the recently developed powerful security design tool to create unique, hard-to-copy elements and protect your vouchers, tickets, documents, labels, packaging . . . against forgery: Arziro™ Design from Agfa Graphics (www.agfagraphics.com/global/en/product-finder/arziro-securitydesign.html)

The hardware configuration (HW) that may perform the present invention as computer implemented method is a computer, tablet computer and the like, comprising a central processing unit (CPU), a memory, a storage device such as a hard disk drive (HDD), a communication interface (IF) device that sends and receives data to and from other hardware configurations via a network. In a preferred embodiment the present invention is performed by one or more GPU's (Graphic Processing Unit).

The hardware configuration may comprise a user interface (UI) device that may comprise a display device, which gives a result of the pattern generation method. The rendering of the pattern to the user interface (UI) device is performed by a raster image processing method in a raster image processor (RIP).

Graphic Processing Unit

Graphic Processing Units (GPU's) have been used to render computer graphics for years. Nowadays they are also used for general-purpose tasks due to their highly parallel structure, making them more efficient than Central Processing Units (CPU's).

GPU's can be combined with CPU's to achieve greater performance. In this way, serial parts of the code would run on the CPU and parallel parts would do it on the GPU. While CPU's with multiple cores are available for every new computer and allow the use of parallel computing, these are focused on having a few high performance cores. On the other hand, GPU's have an architecture consisting of thousands of lower performance cores making them especially useful when large amount of data have to be processed.

One of the most popular tools available on the market of GPU computing is CUDA. CUDA is a parallel computing platform and programming model created by Nvidia™ and available only for their GPU's. The main advantage of CUDA is its ease of use, using the language known as CUDA C which is essentially an extension of C, with similar syntax and very easy to integrate in a C/C++ environment.

The needed data is first copied from the main memory to the GPU memory (①), the CPU sends an instruction to the GPU (②), the GPU executes the instruction in all the parallel cores at the same time (③), and the result is copied back from the GPU memory to the main memory (④).

CUDA parallel execution units consist of threads grouped into blocks. Combining the use of blocks and threads the maximum number of available parallel units can be launched, which for the latest GPU's can be more than 50 million. Even though this is a great amount of parallel capability, there are some cases where data might exceed the limit. In those cases, the only possibility is to iterate through the grid of millions of parallel units as many times as needed till all the data is processed.

Raster Image Processing Method

A raster image processing method is an image manipulation method that interpret a document to render the interpretation of the document to:—a raster graphic which is suitable for viewing on a display device such as a television, computer monitors or the display device of a tablet computer or mobile phone; or a raster graphic which is suitable for projecting the raster graphic by a projector device such as a video-projector, LCD projector, DLP projector LED projector or laser diode projector; or a raster graphic which is suitable for printing on a printer device such as a toner-based printer, an inkjet printer or offset press.

A content output device is a device which reproduces the content data of a document in its document space such as a display device, projector device or printer device.

A raster image method is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise a user interface (UI) device that may comprise a display device.

The apparatus that performs a raster image processing method is called a raster image processor (RIP). A raster image processor (RIP) may comprise a prepress workflow system such as Prinect Workflow System™ from Heidelberger Druckmaschinen AG or Apogee Prepress™ from Agfa Graphics NV or the prepress workflow system disclosed in US20130194598 (FUJI XEROX).

In a preferred embodiment a raster image processor comprises one or more GPU's for faster rendering a document to a content output device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a security document including a pattern, the method comprising the steps of:
   selecting a bounding region in a document, an image object, and a raster image;
   cutting the image object into image object partitions;
   selecting a task including a sequence of image transformations, a minimum one of the image transformations depending on input parameters of the task;
   duplicating the image object as the pattern in the bounding region; and
   determining for each of the image objects in the pattern:
      a position area in the bounding region; and
      a set of values from pixels in the raster image within the position area relative to the raster image, and transforming each of the image object partitions by the task with the set of values as an input value of the task; wherein
   an image transformation from the sequence of image transformations includes a translation.

2. The method for manufacturing a security document according to claim 1, wherein each of the image transformations from the sequence of image transformations is selected from the group consisting of a geometric transformation, a color transformation, a line thickness transformation, and a dashed line transformation.

3. The method for manufacturing a security document according to claim 2, wherein the step of cutting the image object into the image object partitions includes cutting through one or more axes of symmetry of the image object.

4. The method for manufacturing a security document according to claim 3, further comprising the step of:
   adding a contour line around each of the image object partitions.

5. The method for manufacturing a security document according to claim 1, wherein the pattern is a lattice pattern selected from the group consisting of a rectangular lattice, a parallelogrammic lattice, an equilateral triangular lattice, a rhombic lattice, a square lattice, and a hexagonal lattice.

6. The method for manufacturing a security document according to claim 1, wherein the security document is a passport, an identity card, a postage stamp, a product authentication, a driving license, a banknote, or a stock certificate.

7. A method for manufacturing a security document including a pattern, the method comprising the steps of:
   selecting a bounding region in a document, an image object, and a function;
   cutting the image object into image object partitions;
   selecting a task including a sequence of image transformations, a minimum one of the image transformations depending on input parameters of the task;
   duplicating the image object as the pattern in the bounding region; and
   determining for each of the image objects of the pattern a position in the bounding region, returning a set of values from the function with the position as an input value for the function, and transforming each of the image object partitions by the task with the set of values as the input value of the task; wherein
   an image transformation from the sequence of image transformations includes a translation.

8. The method for manufacturing a security document according to claim 7, wherein each of the image transformations from the sequence of image transformations is selected from the group consisting of a geometric transformation, a color transformation, a line thickness transformation, and a dashed line transformation.

9. The method for manufacturing a security document according to claim 8, further comprising the step of:
   determining an identifier; wherein
   the returned set of values is calculated from the function in which the identifier is an additional input value for the function or an additional input parameter of the task.

10. The method for manufacturing a security document according to claim 9, wherein the step of cutting the image object into image object partitions includes cutting through one or more axes of symmetry of the image object.

11. The method for manufacturing a security document according to claim 10, further comprising the step of:
    adding a contour line around the image object partitions.

12. The method for manufacturing a security document according to claim 8, wherein the geometric transformation is selected from the group consisting of a translation, a rotation, a reflection, a transflection, scaling, and shear mapping.

13. The method for manufacturing a security document according to claim 12, wherein the pattern is a lattice pattern selected from the group consisting of a rectangular lattice, a parallelogrammic lattice, an equilateral triangular lattice, a rhombic lattice, a square lattice, and a hexagonal lattice.

14. The method for manufacturing a security document according to claim 13, wherein the image object includes a vector graphic that is triangular, quadratic, rectangular, heptagonal, pentagonal, oval, rhombus, octagonal, circular, oval, regular polygonal, or elliptical shaped.

15. The method for manufacturing a security document according to claim 7, wherein the security document is a passport, an identity card, a postage stamp, a product authentication, a driving license, a banknote, or a stock certificate.

* * * * *